Aug. 17, 1965   W. B. READ   3,200,684
SCORING DEVICE

Filed April 20, 1964   3 Sheets-Sheet 1

INVENTOR.
WILLIAM B. READ

BY
ATTORNEYS

Aug. 17, 1965  W. B. READ  3,200,684
SCORING DEVICE

Filed April 20, 1964  3 Sheets-Sheet 3

INVENTOR.
WILLIAM B. READ
BY
ATTORNEYS

United States Patent Office 3,200,684
Patented Aug. 17, 1965

3,200,684
SCORING DEVICE
William B. Read, Sylvania, Ohio, assignor to Owens-Illinois Glass Company, a corporation of Ohio
Filed Apr. 20, 1964, Ser. No. 361,180
6 Claims. (Cl. 83—12)

This invention relates to apparatus for making a score line on the inside of glass tubing.

More particularly, this invention relates to apparatus which is capable of being inserted within a tubing of varying size and which will apply an internal circumferential score line within the tubing at substantially uniform depth.

In the past it has been extremely difficult to cut glass tubing, particularly that tubing which is of relatively thick wall construction. It has been necessary in the past to use expensive bench-type or factory-type machinery to accurately cut glass tubing of this type.

Thus it can be seen that most tubing is cut to size before it is shipped to the contractor who is to install it in the location where it is to be used. In many instances, particularly in the case of drain line which is used in situations where metal line cannot be used because of chemical attack, and where glass is a much superior material from the standpoint of visual observation, standard lengths are not convenient and it is necessary to special order tubing cut to odd lengths.

In view of the foregoing, it is an object of this invention to provide apparatus which may be used by the contractor at the site of installation of glass pipe for cutting pipe to desired lengths.

It is an additional object of this invention to provide scoring apparatus which is adjustable so that it may be used to score tubing within a wide range of diameters.

It is a further object of this invention to provide apparatus which will score inside of glass pipe which is self-aligning and permits uniform scoring depth in pipe which may not be precisely round.

It is a still further object of this invention to provide an adjustable glass pipe internal scoring tool having a settable torque limiter to prevent excessive scoring pressure.

It is a still further object of this invention to provide an adjustable, glass pipe internal scoring tool having flexible scoring arms to allow for pipe ovality.

Other and further objects will be apparent from the following description taken in conjunction with the annexed sheets of drawings, wherein.

Figure 1:
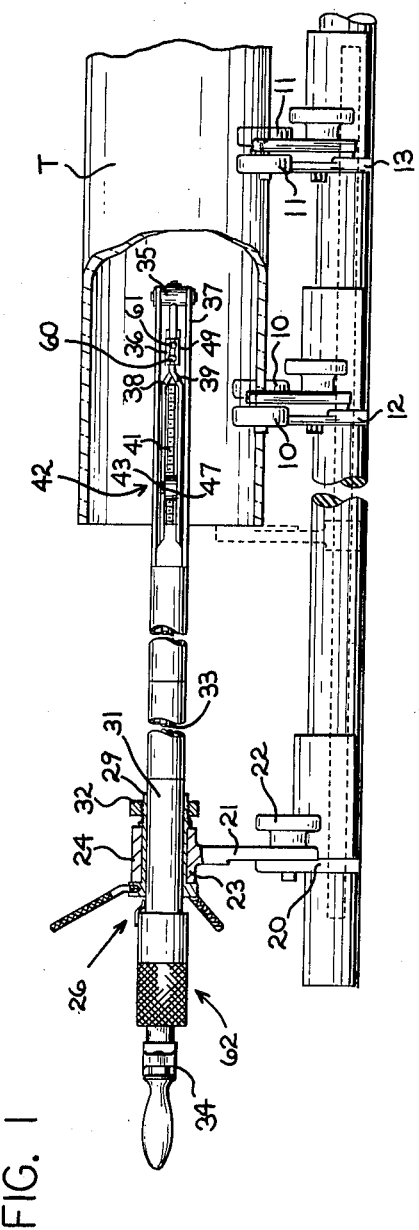
FIG. 1 is a side elevational view of the scoring of the invention and pipe supporting structure.
Figure 2:
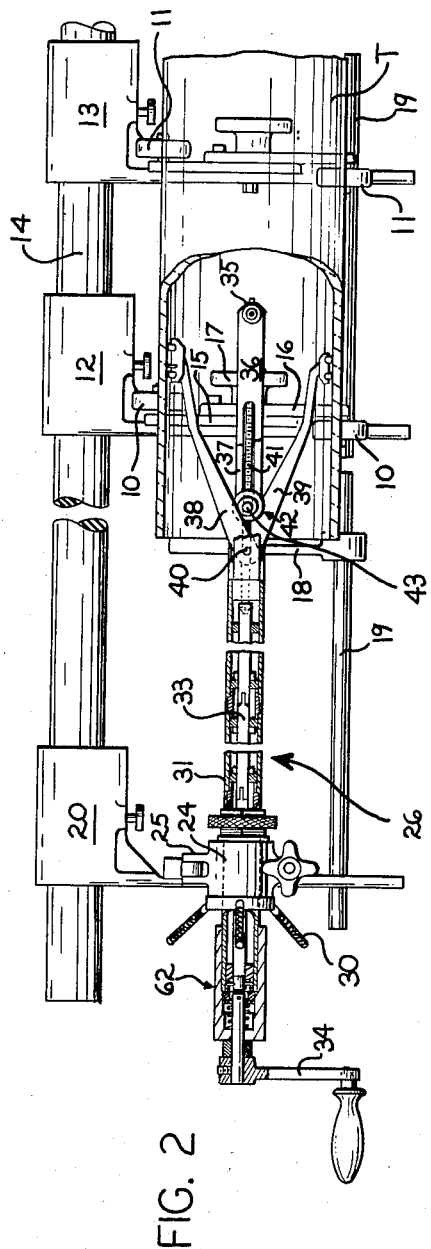
FIG. 2 is a top plan view of the scoring tool of the invention showing the scoring arms in expanded contacting position.

Referring now to the drawings, and particularly to FIGS. 1 and 2, the invention will be described and its portable features will be apparent from the following description.

The tubing "T," which it is desired to cut, is supported in a horizontal position on sets of rollers 10 and 11, with the rollers 10 adjustably mounted to brackets 12 and 13. The brackets 12 and 13 are guided in a horizontal direction by a rail 14 which extends throughout the length of the tubing which the device is intended to support. The rollers 10 and 11 are vertically adjustable with respect to the brackets 12 and 13 by reason of the fact that they are carried by the ends of arms 15 and 16 which are pivotally connected to the bracket 12 and adjustably secured thereto by a threaded locking screw 17. In this manner the rollers 10, which are connected to the bracket 12, may be raised or lowered by pivoting of their arms 15 and 16 to any desired position to accommodate tubing of different diameters. In a like manner the rollers 11 may be adjusted with respect to their bracket 13. Additional brackets may be provided along the length of the rail 14 as will be necessary to support tubing of varying lengths.

Thus it can be seen that tubing, which it is desired to cut, is placed on the rollers 10 and 11 which have been previously adjusted to the proper location to accommodate tubing of the particular diameter. The tubing is moved axially until it engages a stop arm 18. The stop arm 18 is adjustably secured to a rail 19. The stop arm 18 will locate the end of the tubing with respect to the cutting tool in those situations where a plurality of pieces of tubing are being cut to the same desired length.

The rail 14 also serves to support a bracket 20 which is slideable along the rail 14 in the same manner as brackets 12 and 13 and has an arm which extends normal to the axis of the rail 14.

A vertically extending support member 21 is adjustably connected to the bracket 20 by a threaded clamping screw 22. The upper end of the support member 21 carries the bottom half 23 of a split sleeve. The upper half 24 of the split sleeve is pivotally connected at 25 to the support member 21.

The scoring tool, generally designated 26, is supported in its entirety by the two halves of the sleeves 23 and 24 by placing the tool 26 on the bottom half 23 and pivoting the upper half thereover. The two halves are clamped together by a pivoted clamp nut 27 which is pivotally connected to the member 21 and when the two halves 23 and 24 are in assembled position, swings over and engages a pair of fingers 28 formed on the upper sleeve 24.

Figure 3:
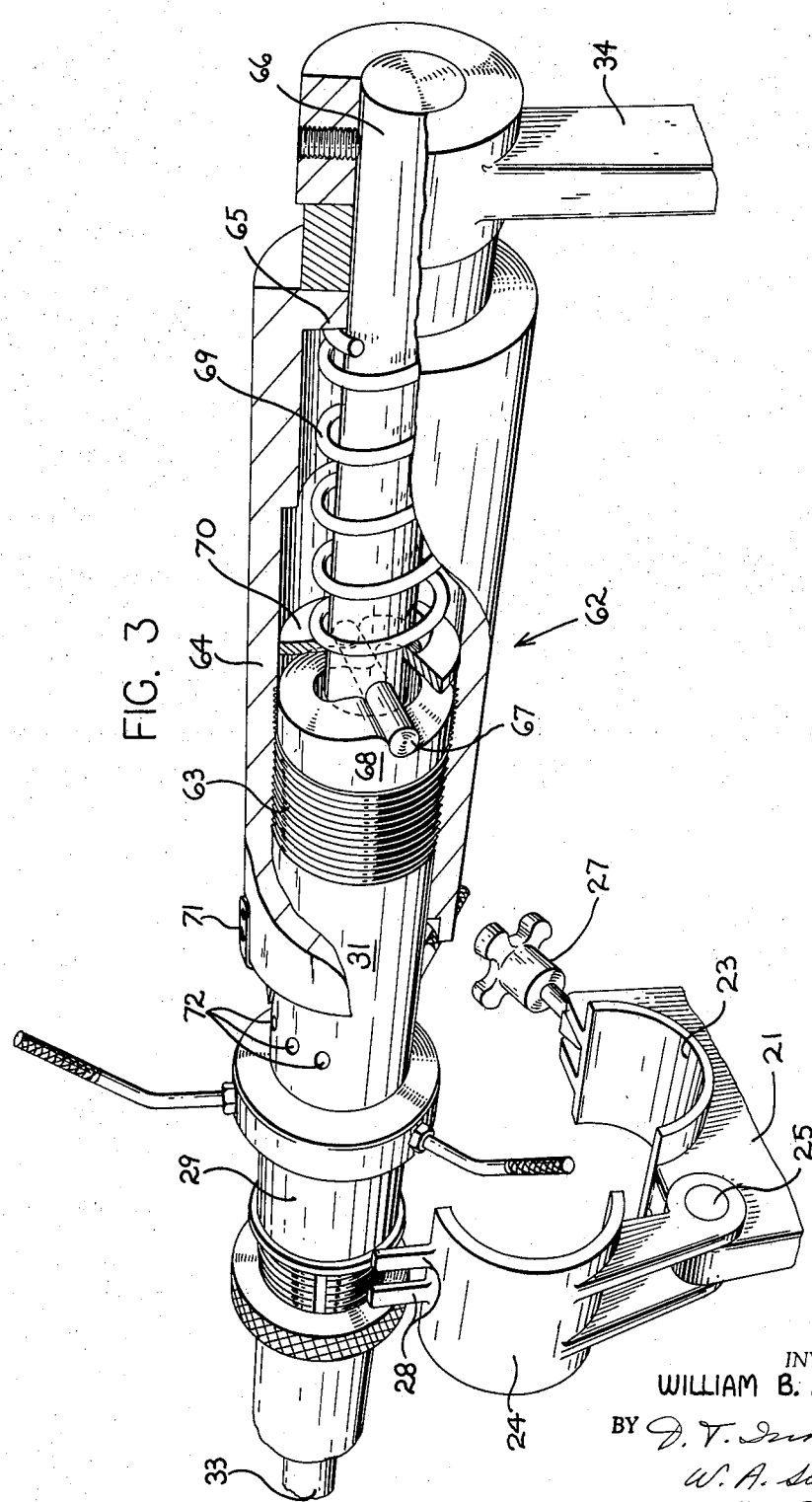
FIG. 3 is an enlarged perspective view of the handle portion of the scoring tool.

The scoring tool 26 basically comprises a length of aluminum tube 31 which, in actual practice, is comprised of several separate lengths of tubing joined together end to end to form an elongated structure. The tool 26 has a split sleeve 29 to which a capstan handle 30 is connected. The tube 31 is positioned within the split sleeve 29 and the sleeve 29 may be clamped to the tube 31 by rotation of the knurled nut 32. As best seen in FIG. 3, the knurled nut 32 is threadedly engaged with the split end of the sleeve 29. It will be recognized that the threaded portion of the split sleeve 29 is provided with tapering wall thickness so that rotation of the nut toward the left, as viewed in FIGS. 1 and 2, will serve to clamp the sleeve to the tube 31. Basically, the tube 31 serves as a support for a shaft 33 which extends axially throughout substantially the full length of the tool 26. Here again, the shaft 33 is made up of sections. However, basically, it may be considered a single shaft. It is made in sections so that the length of the tool may be adjusted for insertion within tubing to a greater or lesser extent depending upon where the score line is to be applied. A crank arm 34 is supported at one end of the tube 31 while the opposite end of the tube 31 supports a pair of guide plates 36 and 37. A bearing block 35 is supported by and joins the outer ends of the guide plates 36 and 37.

A pair of scoring arms 38 and 39 are pivotally connected at 40 to the junction of the tube 31 and guide plates 36 and 37. The scoring arms are formed of spring metal resulting in a certain amount of spring action by the arms during scoring of tubing. The shaft 33, in the area between the guide plates 36 and 37, is provided with machine threads at 41.

Figure 4:
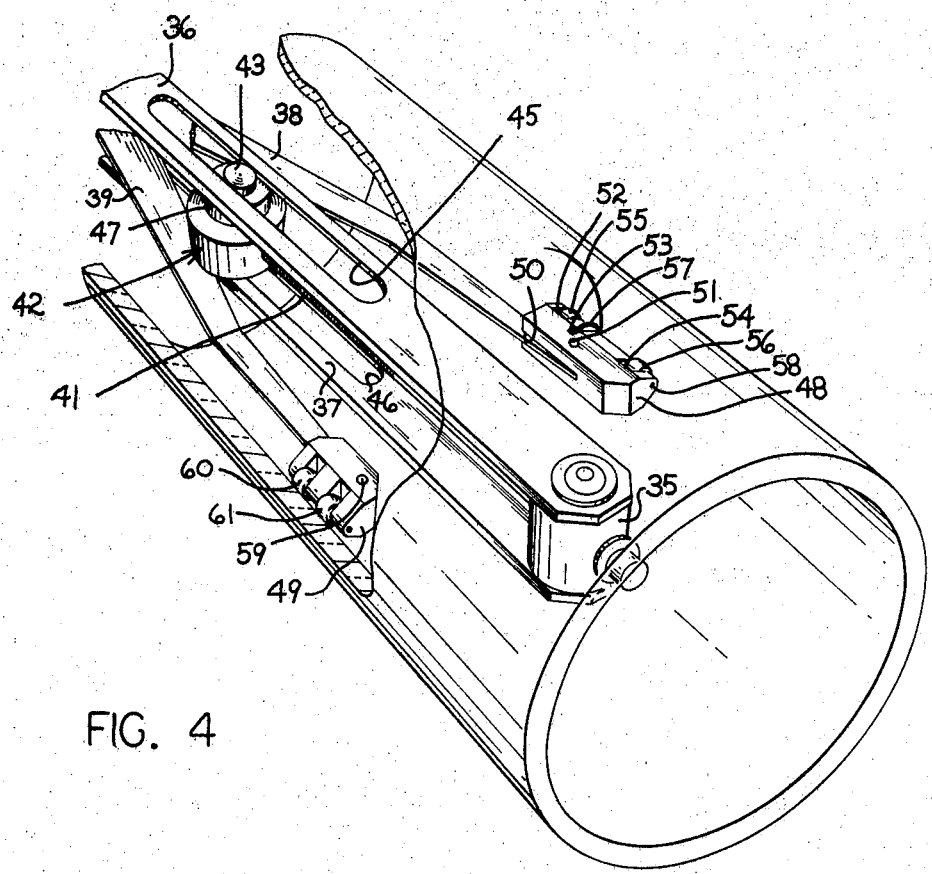
FIG. 4 is an enlarged perspective view of the scoring end of the tool of the invention.

A cam nut 42 is threadedly received on the threaded portion 41 of the shaft 33 and carries a pair of oppositely extending stud portions 43 and 44. As can be seen when viewing FIG. 4, the guide plates 36 and 37 are provided with longitudinally extending slots 45 and 46 respectively within which the studs 43 and 44 respectively are adapted to ride. Thus it can be seen that rotation of the shaft 33 and its threaded portion 41 will move the cam nut 42 axially with respect to the shaft 33. The cam nut 42 is formed with two cam surfaces 47. It will be readily appreciated that cam surface 47 shown in FIG. 4 is repeated on the bottom side of the cam nut 42. The cam surfaces are adapted to engage the arms 38 and 39 and as the cam nut 42 moves toward the left, as viewed in FIGS. 1 and 2, the arms 38 and 39 will be spaced outwardly until their ends engage the inside of the tubing.

The ends of the arms 38 and 39 are provided with self-aligning bearing members 48 and 49 which engage the inside of the glass tubing. The member 48 is comprised of an elongated block having a slot 50 cut into the inner surface thereof within which the end of the arm 38 extends. A pin 51 extending transversely through the member 48 pivotally connects the member 48 to the arm 38. The forward face or side of the member 48, opposite the slotted side thereof, is bevelled outwardly with three spaced-apart inwardly extending cut-out portions 52, 53 and 54.

As can be seen when viewing FIG. 4, the cut-outs 52 and 54 have rollers 55 and 56 positioned therein and the cut-out 53 has a scoring wheel 57 positioned therein. The rollers 55 and 56 and the scoring wheel 57 are rotatably mounted with respect to the member 48 by a pin 58 which forms the axis for these three rotating members. It should be pointed out that the scoring wheel has a diameter slightly larger than the diameter of the rollers 55 and 56 so that when the member 48 is pressed against the glass the wheel will be capable of cutting to a fixed predetermined depth.

The other arm 39 carries the member 49 which is mounted to its arm by a pin 59 in the same manner as the member 48 is mounted to the arm 38. The member 49 also carries two rollers 60 and 61 which will bear against the inner surface of the glass when the two arms 38 and 39 are spread apart by the cam nut into cutting relationship with respect to the tubing. Thus it can be seen that the member 49 serves as a balance wheel holder with respect to the member 48 and the arms 38 and 39, as best seen when viewing FIG. 1, are bent such that the arms contact the glass at diametrically opposed points. When the tube 31 is rotated about its longitudinal axis, the scoring wheel 57 will score the inside of the tubing "T" and the two rollers 60 and 61 on the member 49 will bear against the glass at opposite sides of the score line.

In order to ensure that the members 48 and 49 bear against the inside of the glass tubing with a predetermined force, a torque limiting device, generally designated 62, is provided between the crank 34 and the cam nut driving shaft 33. The torque limiting device is illustrated in detail in FIG. 3.

The shaft 33 extends within the tube 31 to a position approximately co-extensive with the end of the tube 31. This end of the tube 31 is provided with external threads 63 to which an internally threaded sleeve 64 is applied. The sleeve 64 is formed, at the right end as shown in FIG. 3, with an internal shoulder portion 65.

A crank shaft 66 extends into one end of the sleeve 64 and has its outer end fixed to the crank arm 34. The inner end of the shaft 66 carries a transversely extending dowel 67 which is adapted to bear against a face cam 68. The face cam 68 is fixed to the end of shaft cam 33. Thus it can be seen that rotation of the shaft 66 by the crank 34 is transmitted by the dowel 67 to the face cam 68 which is connected to the shaft 33. As long as the dowel 67 is held in driving relationship with respect to the face cam 68, the shaft 33 will rotate in synchronism with the crank shaft 66.

The dowel 67 is held in contact with the face cam 68 by means of a compression spring 69 which bears against the internal shoulder 65 of the sleeve 64 at one end and has its other end in contact with a washer 70 which is slideably mounted on the crank shaft 66 and abuts the dowel 67 on the side thereof opposite from the side which is in engagement with the face cam 68. Thus it can be seen that as long as the face cam 68 rotates without substantial resistance, the dowel 67 will remain in driving engagement therewith. The force with which the dowel is maintained in contact with the face cam 68 is dependent upon the compressive strength of the spring 69. Thus it can be seen that when the shaft 33 is rotated, which rotation moves the cam nut to cause the arms 38 and 39 to spread within the tubing "T," a certain amount of torque is necessary to continue the rotation.

The connection between the crank shaft 66 and the shaft 33 is sufficient to overcome the initial torque necessary to move the arms outwardly into contact with the glass. However, as the arms bear against the inner surface of the glass, the torque required to rotate the shaft 33 increases substantially and when a predetermined amount of force is applied to the arms by the cam nut, the torque limiter 62 will slip, preventing further application of torque to the shaft 33. This slippage occurs between the dowel 67 and the face cam 68.

Due to the fact that the tool of the invention is intended for use in cutting tubing having a range of diameters, and that it is desirable that the amount of force with which the arms are pressed against the internal surface of the glass be substantially constant. Thus it is necessary to adjust the spring force of the torque limiter 62. The arms must be scissored outwardly with varying degrees of force depending upon the angles which the arms make with respect to the cam nut at the time they engage the wall of the tubing.

With this in mind, the torque limiter 62 is adjustable by rotation of the sleeve 64 relative to the tube 31. It can readily be seen that since the connection between the sleeve 64 and the tube 31 is by way of threads, rotation of the sleeve will move the abutment 65 of the tube 64 relative to the face cam 68. Relative movement of the shoulder 65 with respect to the face cam 68 will change the compressive force of the spring 69, thus providing a greater or less possible maximum torque transmission between the crank shaft 66 and the shaft 33.

In order to provide a setting for the sleeve 64 relative to the tube 31, a pointer 71 is fixed to the sleeve 64 at the forward end thereof with the end of the pointer overlying the surface of the tube 31. Indicia 72 are provided on the surface of the tube 31 adjacent the end of the pointer 71. The indicia 72 relate to diameter settings. For example, the three spots which are shown in FIG. 3 would be for setting of 1½" glass tubing, 3" glass tubing and 6" glass tubing. In this manner the compression of the spring 69 is settable, in accordance with the diameter of the glass tubing.

Various modifications may be resorted to within the spirit and scope of the appended claims.

I claim:
1. Apparatus for applying an internal score line on glass tubing comprising, an elongated support member, a pair of spring steel arms, means pivotally connecting said arms to said support adjacent one end thereof on a common axis, scoring means mounted on the free end of one of said arms a cam nut mounted on said support intermediate the end thereof and said arm pivot, means extending through said support for shifting said cam nut longitudinally of said support to pivot said arms outwardly, means connected to said cam moving means adjacent the opposite end thereof for operating said moving means, a presettable force limiting means interposed said cam moving means and said means for operating said cam moving means, whereby a preselected force is supplied to said cam nut, and means connected to said support means for rotating said support about its longitudinal axis.

2. Apparatus for applying a diametral score line on the inside of glass tubing comprising, an elongated support member adapted to be inserted within the tubing, a pair of spring arms, means pivotally connecting said arms to said support adjacent one end thereof on a common axis, scoring means mounted on the free end of one of said arms, a cam nut mounted on said support intermediate the end thereof and said arm pivot and adapted to engage said arms to spread said arms apart into engagement with the inside of the glass tubing, a threaded shaft extending axially of said support member for shifting said cam nut longitudinally of said support to pivot said arms outwardly, means connected to said threaded shaft for rotating said shaft, presettable torque limiting means interposed said shaft rotating means and said shaft, and means connected to said support means for rotating said support about its longitudinal axis to effect a score line within the tubing.

3. The apparatus as defined in claim 2 further including a balancing wheel holder connected to the free end of said other arm, a pair of balancing wheels carried by said holder whereby said balancing wheels engage the inner surface of the glass tubing at a diametrically opposite point from the point of contact of said scoring means.

4. Apparatus for applying a diametral score line on the inside of glass tubing comprising, an elongated support member, a pair of spring arms, means pivotally connecting one end of said arms to said support adjacent one end thereof on a common axis, a cam nut mounted on said support and adapted to be shifted toward and away from said arm pivot, a shaft extending axially of said support and threads formed thereon at one end thereof on which the cam nut is threaded, means connected to said shaft for rotating said shaft to shift said cam nut axially of said support, presettable torque applying means interposed said shaft and said means for rotating said shaft whereby said arms are moved into contact with the inside of the glass tubing with a predetermined force, and means connected to said support means for rotating said support about its longitudinal axis.

5. Apparatus for applying an internal score line to glass tubing, comprising an elongated support member adapted to have one end inserted within the tubing, a pair of arms formed of resilient material pivotally connected on a common axis to the support adjacent the end thereof which is to be inserted within the tubing, a cam member slidably carried by said support member and adapted to engage said arms to move said arms outwardly into diametrically opposed contact with the inside of the glass tubing, a threaded shaft extending axially of said elongated support member and threadedly engaging said cam member, and a presettable torque limiting device connected to the end of said threaded shaft for limiting the amount of force applied to move the arms against the wall of the tubing.

6. The apparatus as defined in claim 5, wherein said torque limiting device comprises a face cam connected to the other end of said threaded shaft, a crank shaft positioned in axial alignment with the threaded shaft, a member carried by said crank shaft and adapted to bear against said face cam, biasing means for holding said member and cam face in driving relationship, and means for adjusting the biasing force of said biasing means.

References Cited by the Examiner
UNITED STATES PATENTS

| | | | |
|---|---|---|---|
| 672,312 | 4/01 | Cook | 30—106 |
| 934,487 | 9/09 | Ward et al. | 30—106 |
| 996,385 | 6/11 | Wilkins | 30—164.95 |
| 1,006,574 | 10/11 | Lorenz | 82—101 X |
| 1,024,983 | 4/17 | Frink. | |
| 1,231,743 | 7/17 | Johnston. | |
| 2,607,376 | 8/52 | Montgomery | 144—205 |

WILLIAM W. DYER, Jr., *Primary Examiner.*

LEON PEAR, *Examiner.*